UNITED STATES PATENT OFFICE.

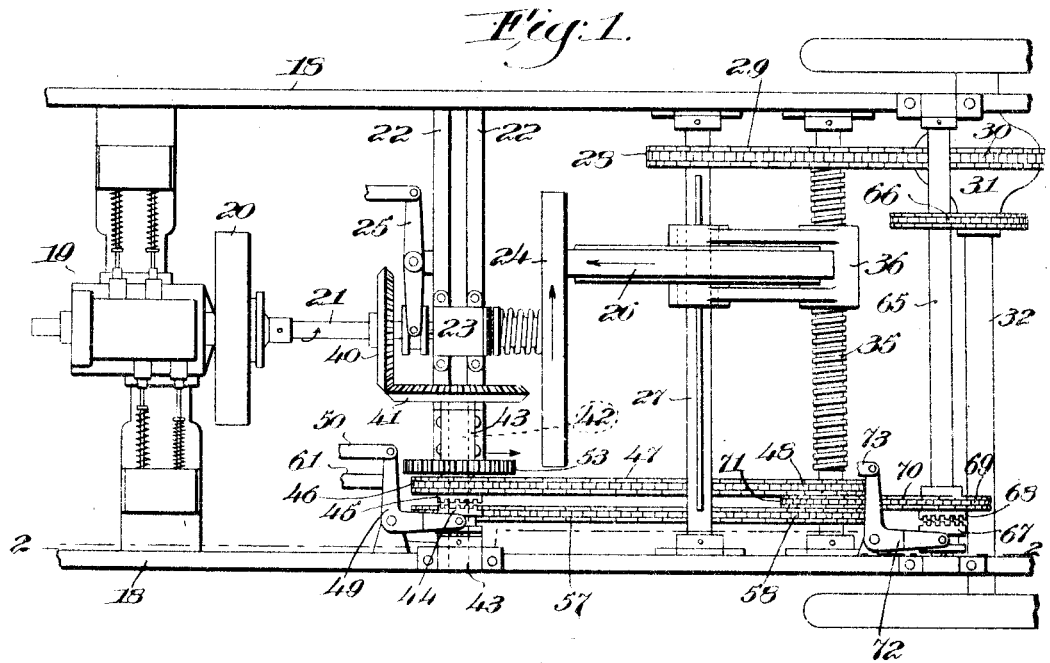

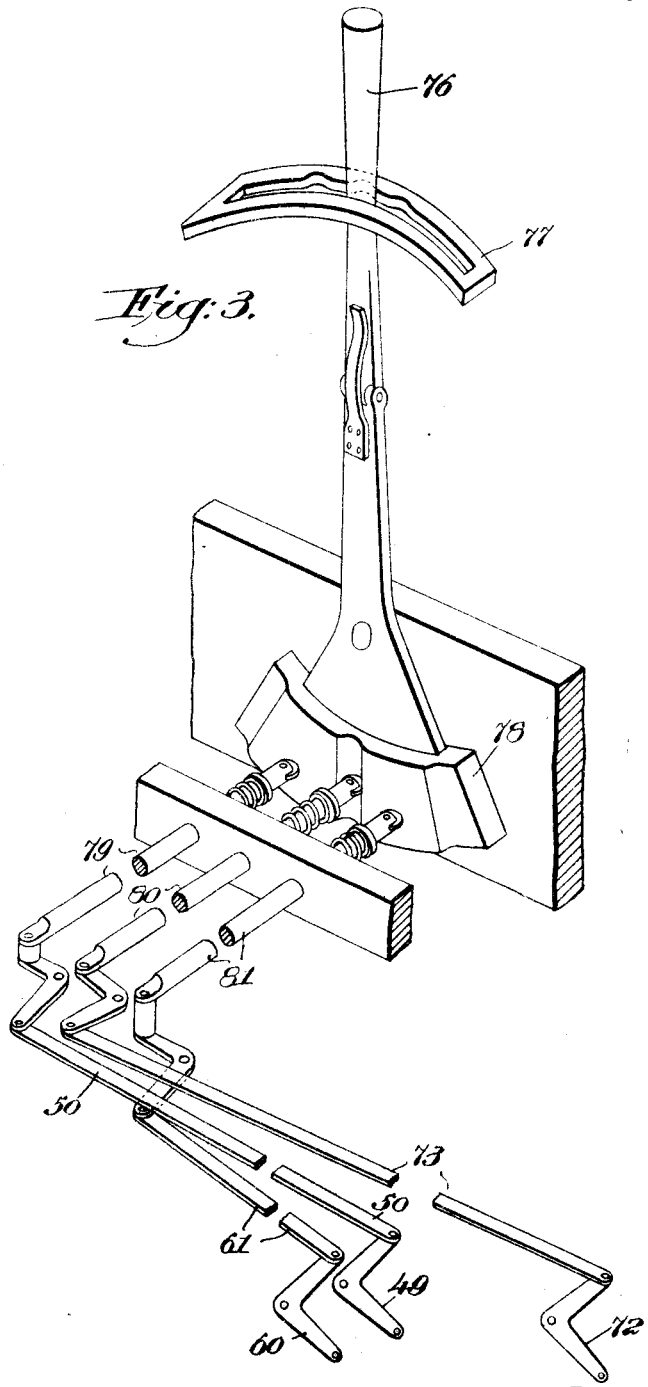

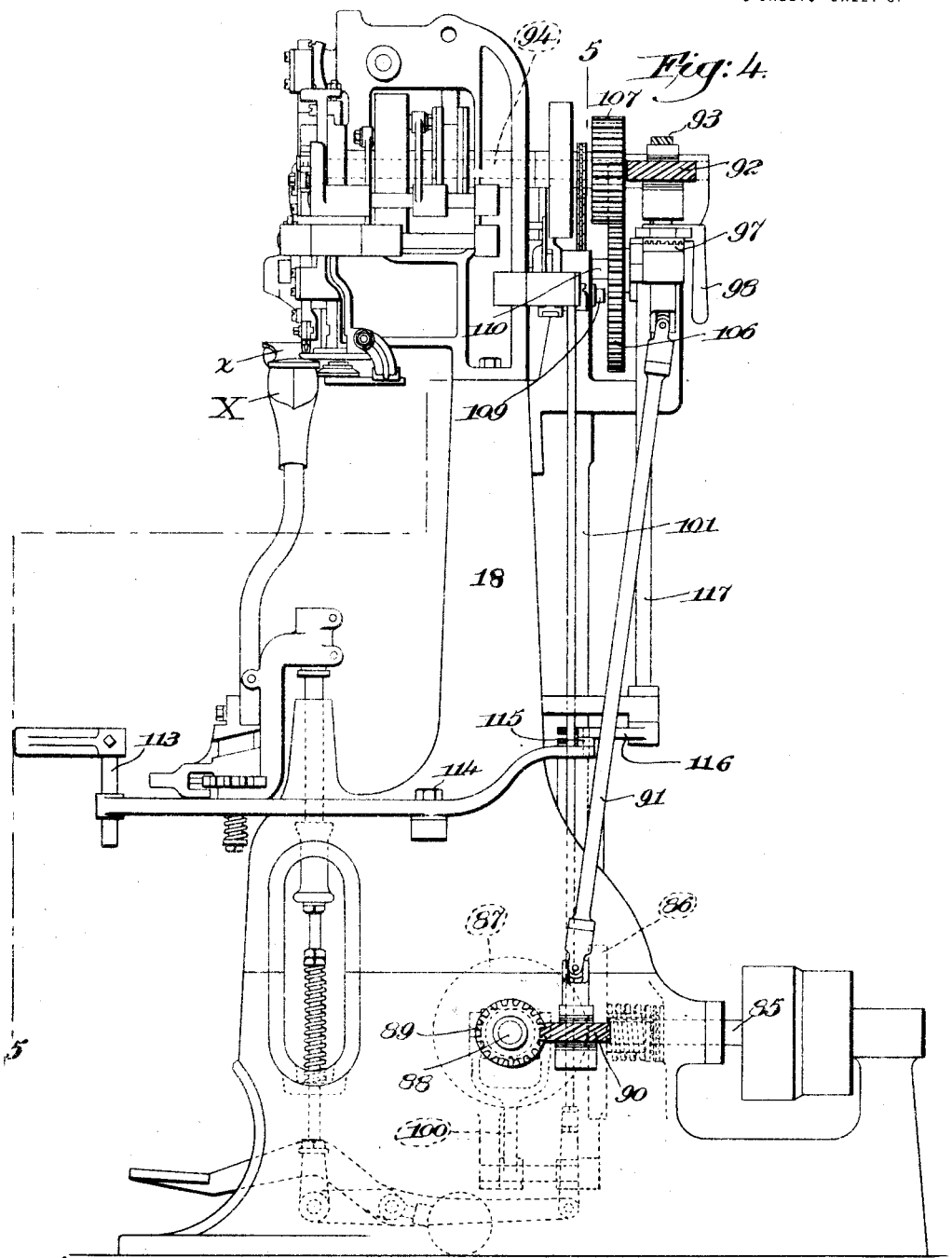

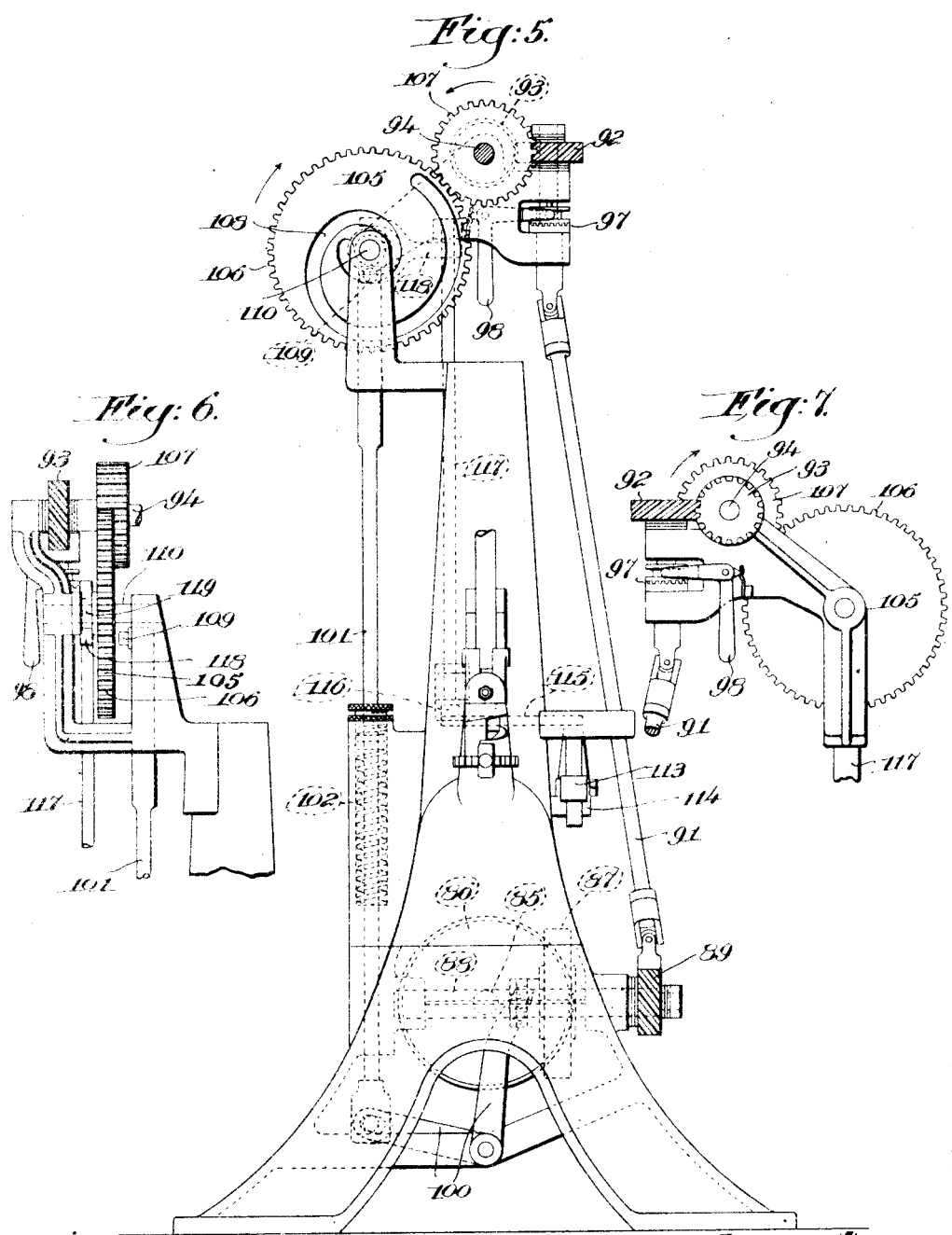

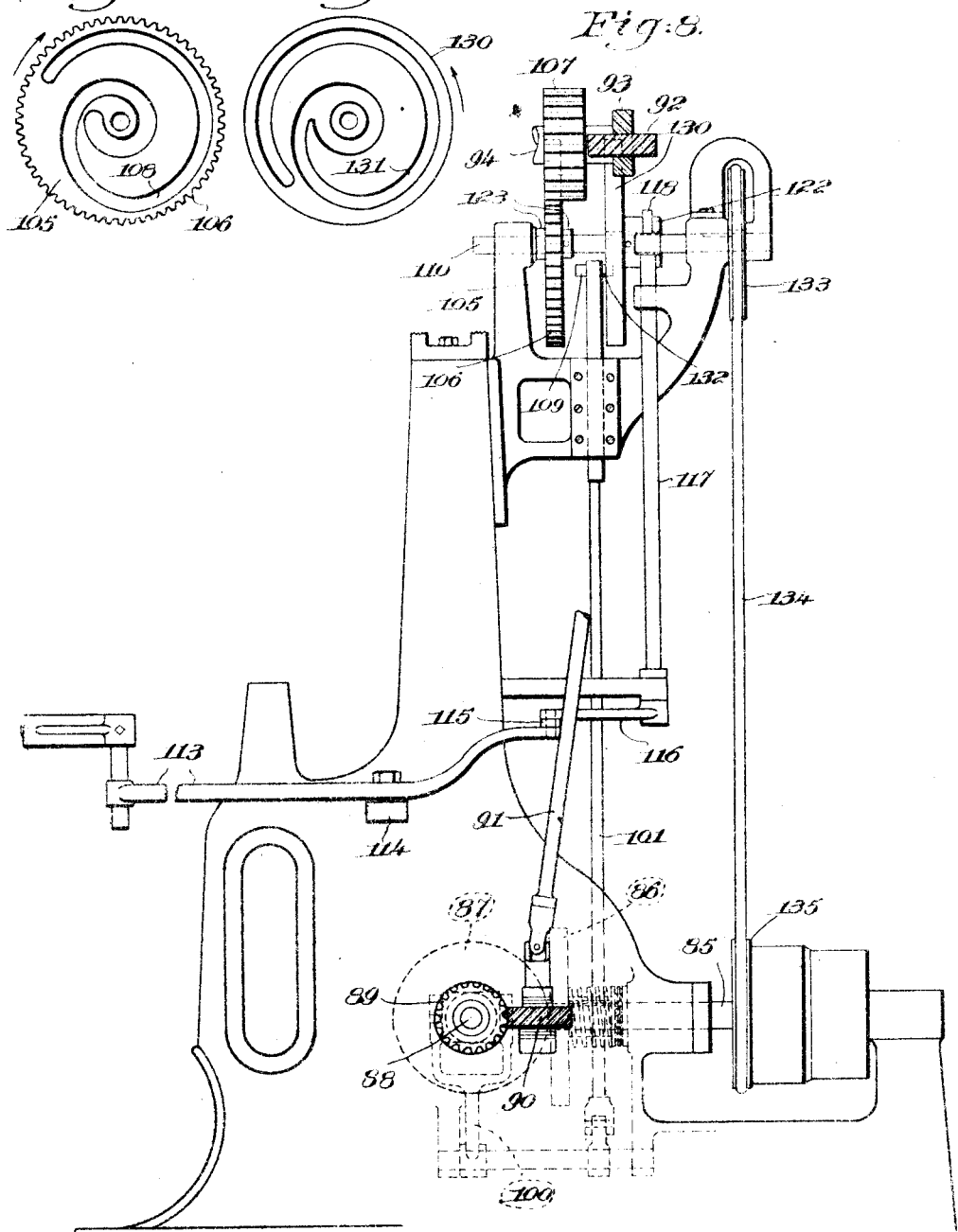

AUGUST R. SCHOENKY, OF SOMERVILLE, MASSACHUSETTS.

SPEED-CHANGING MECHANISM FOR POWER-DRIVEN MACHINES.

1,167,365.  Specification of Letters Patent.  Patented Jan. 4, 1916.

Application filed January 7, 1914. Serial No. 810,696.

*To all whom it may concern:*

Be it known that I, AUGUST R. SCHOENKY, a citizen of the United States, residing at Somerville, in the county of Middlesex and State of Massachusetts, have invented certain new and useful Improvements in Speed-Changing Mechanism for Power-Driven Machines, of which the following is a specification, reference being had therein to the accompanying drawing.

This invention relates to speed changing mechanism for power driven machines and particularly to a mechanical combination of elements whereby the relative speed of the driver or power shaft and the driven member, such as a running shaft, may be readjusted under proper control for starting or stopping, increasing, decreasing or reversing the motion of the driven shaft.

The invention is adaptable to many classes of power driven machines including both self-propelling machines, such as motor vehicles, and stationary machines, such as nail driving or other machines used in factories. The former class represents machines driven in practice at variable speeds and the latter machines having but a single normal speed.

The main object of the present invention is that the motion of the power shaft, which may be supposed to be running continuously and steadily, may be effectively transmitted to the driven shaft in various ratios, these changes or readjustments of transmission being consummated by power under appropriate control.

Other and more specific objects will appear in the hereinafter following description.

To the attainment of such recited objects this invention comprises the combination with the driver or power shaft, and the driven shaft, of a certain kind of adjustable transmitter between them, and connections whereby the transmitter is adjusted directly or indirectly from some portion of the train of driving or driven elements. The transmitter, as distinguished from a mere clutch which connects and disconnects, is of a type having, not only full speed and zero positions, but also intermediate positions, and which preferably enables rather than a mere step by step change, a gradual and progressive change through all consecutive intermediate speed ratios. For convenience this will be designated a variable speed transmitter and herein is illustrated of the type known as " face friction gearing ". The connections by which the variable speed transmitter is readjusted from an element of the train of mechanism may be rendered operative or inoperative according to whether the state of speed of the driven shaft is to be changed or maintained, and according to this invention the shifting of such connections between operative and inoperative condition is adapted to be effected at the will of the operator or in other suitably controlled manner.

As will be hereinafter seen there are illustrated three species of this improvement. Generally speaking, the driver and the elements immediately in train with it may be considered constantly running parts, whereas the driven shaft and parts in train with it are not constantly but intermittently running and, in some cases, variably. In the first species the adjustment of the variable speed transmitter is effected from the driving shaft or a constantly running part immediately in train with it and by these means the driven parts may have their motion started, increased, decreased or reversed. In the second species the variable speed transmitter is adjusted from the driven member or immediately connected part, for example, in order to decrease the speed of the driven member or to effect a stoppage thereof in a peculiarly easy and advantageous mode. In the third species the adjustment is effected not directly from one of the train of elements, but indirectly through the action of a spring or equivalent which may be put under strain by one of the train of driving or driven parts.

Herein are shown three specific illustrations or modifications embodying the present improvement and the several species thereof above mentioned. The first illustration is of a self-propelling class of machine, a motor vehicle, in which are combined the first and second species. The second illustration is of the stationary class of machine, a nail driving machine, in which the second and third species are combined for stopping and starting respectively. The third illustration is also of a nailing machine but illustrating the first and second species.

Each illustration embodies the second species of the invention; namely, that in which the driven member effects adjustment of the variable speed transmitter. In each case this adjustment is toward zero speed and if uninterrupted effects the stoppage of the machine. Moreover this stoppage is effected not only quickly and efficiently but in a certain yet easy manner which precludes unnecessary shock. The peculiar result is attained that the driven shaft effects its own stoppage because it readjusts to zero the variable speed transmitter from which it derives its motion. The adjustment, therefore, of the variable speed transmitter from the running speed to zero is not a steady adjustment but decreases as the machine slows down. The combined action of the slowing driven shaft and the slowing adjustment of the transmitter has the result of an initially rapid rate of speed decrease of the machine, the rate becoming less and less toward the final stopping position and eventually bringing the machine to rest with practically no shock. This advantageous action is partly due to the fact that as the transmitter is adjusted it effects a substantial retarding of the driven shaft and in this way the momentum of the driven shaft and parts connected with it is used up in effecting the adjustment of the transmitter and in retarding the shaft. In this way is afforded a new employment of a variable speed transmitter, which is an instrument devised simply for securing varying running speeds. Herein it is used so that the driven shaft effects a self-adjustment from running speed, whatever it may be, toward or to zero speed thus giving the noiseless, shockless action referred to.

Having stated the general nature of this improvement, the several illustrative embodiments thereof shown in the drawings will now be described in detail and thereafter the novel features will be set forth in the appended claims.

In the accompanying drawings Figure 1 is a plan view of a portion of a self-propelling machine or motor vehicle embodying the present improvements; while Fig. 2 is a left side elevation thereof partly in section on the plane 2—2 of Fig. 1; and Fig. 3 is a diagram showing how the automatic adjustment of the variable speed transmitter may be controlled from a single lever. Fig. 4 is a right elevation of a stationary machine, namely, a nail driving machine, embodying the present improvements; while Fig. 5 is a front elevation partly in section on the plane 5—5 of Fig. 4; and Figs. 6 and 7 are left elevations of details. Fig. 8 is a right elevation of a modified embodiment of the present improvements in a machine of the class and type shown in Figs. 4 to 7; while Figs. 9 and 10 show left and right views of the stopping and starting cams respectively.

First will be described an embodiment of this improvement in connection with a self- propelling machine; namely, a motor vehicle. On the machine frame 18 is supported engine 19 having fly-wheel 20 and shaft 21 which may be considered the driver or driving shaft of the present improvement. Supported on a pair of cross frame bars 22 is bearing 23 for shaft 21. A variable speed transmitter of the face friction type having been adopted for illustration, the shaft 21 is shown as carrying a driving disk 24 which may have the usual aluminum-copper alloy face. The running parts of the present mechanism may conveniently be divided into the driving train of parts including engine 19, fly-wheel 20, shaft 21 and friction disk 24, while the driven train of parts includes the friction wheel coöperating with the disk and the running parts between that and the vehicle axle. The driving train may be considered as continuously running parts, ignoring changes in engine operation, while the driven train may be considered as intermittently running and at varying speeds. For entirely interrupting the drive when desired, a lever 25 may be employed as usual to axially withdraw the disk 24 against the resistance of spring pressure which tends to hold the friction disk in driving engagement, and thus constituting a clutch. In frictional contact with the prepared face of disk 24 is the periphery of friction wheel 26. The periphery may consist of a strawboard fiber ring. The wheel 26 is on a cross shaft 27 and is capable of axial adjustment, for example, by a spline between wheel and shaft. A sprocket wheel 28 on the cross shaft 27 operates through chain 29 and sprocket wheel 30 to drive the differential case 31 on the rear axle 32 of the vehicle whereby the driving action is communicated to the axle to cause the travel of the vehicle. Ordinarily friction wheel 26 would be adjusted at will to various positions with respect to the disk 24 so that the disk would drive the wheel forwardly or reversely at varying speeds, or if the wheel be adjusted to the center of the disk, at zero speed. By this adjustment and by the clutch lever 25 and by the vehicle brakes a certain control was afforded.

According to the present improvement the adjustment of the variable speed transmitter; namely, the friction disk and wheel, is to be effected by a running part of the mechanism for changing the speed ratio with proper provision for control. To enable the adjustment of the friction wheel with respect to the disk an adjusting device 35 is shown in the nature of a helical cam or screw shaft the rotation of which, operating through a threaded support 36, causes the axial adjustment of the wheel 26 carried by the support. In order to adjust the wheel 26 to commence or increase forward motion of the driven shaft 32, the following connections from the driving train of parts may be employed: On the driver shaft a bevel gear 40 engaging a similar gear 41 on a short, constantly running cross shaft 42 supported in bearings 43. Through the cross shaft the driving shaft may operate the adjusting screw 35, but the connections are adapted to be disconnected or connected at will so that the adjustment and speed may be maintained or may be increased at will. To this end a clutch member 44 fast on shaft 42 coöperates with clutch member 45 to which is secured sprocket wheel 46 connected by chain 47 with sprocket wheel 48 upon the adjusting screw 35. A bell crank lever 49 is indicated for shifting the clutch 44, 45 and a connection 50 may extend from the lever 49 to a suitable controlling part. By these described connections the operator may at will close the clutch 44, 45 and thereby cause the driving shaft 21 to effect an adjustment of the variable speed transmitter to relatively increase or initiate forward motion in the driven shaft 32. A reverse adjustment may be similarly effected by the following connections: On the cross shaft 42 is shown a gear 53 engaging a second gear 54 beneath it upon a second cross shaft 55 which therefore is continuously running in a direction reverse to that of shaft 42. By means of sprocket wheel 56, chain 57 and sprocket wheel 58 motion may be communicated to the adjusting screw 35, and between the shaft 55 and the sprocket 56 is a clutch 59, similar to clutch 44, 45, and similarly operated by a clutch lever 60, having connection 61 to a suitable controlling part. By these connections, when the clutch 59 is closed, the screw 35 is so rotated as to reversely adjust the friction wheel 26 thus decreasing the forward speed of the driven parts or, if they be stationary, causing a reverse drive thereof.

It will be manifest that in employing either of the adjusting connections above described the operator must be prepared to disconnect at the proper time and this is eminently satisfactory for forward or reverse driving. For stopping, however, it may be undesirable to give attention to throwing out the clutch 44, 45, or the clutch 59 at the zero position and consequently the transmitter adjusting connections, now to be described, possess a special value and importance.

The connections about to be described are actuated from the driven train of parts contrary to the previously described connections and, when connected, tend always, in the illustrated embodiment, to adjust the variable speed transmitter toward zero or stop position, and, if the adjustment is uninterrupted, actually to the zero or stop position with the friction wheel at the center of the disk. When this adjustment is attained, the driven train of parts and the adjusting connections come to a standstill requiring no attention to that end from the operator.

While the connections referred to might be actuated directly from the friction wheel shaft or screw 35, for convenience of illustration a special driven shaft 65 is shown, this being rotated from the driven shaft or rear axle 32 by means of a sprocket chain 66. For connecting and disconnecting the connections a clutch member 67 fast on the shaft 65 engages a clutch member 68; and to the latter is secured a sprocket wheel 69 connected by chain 70 with a sprocket wheel 71 on the screw threaded shaft 35. A clutch lever 72 serves to open and close the clutch 67, 68 and a connection 73 may extend from the clutch lever to a suitable control part.

The operation of the recited connections is that when the clutch 67, 68, is closed, the shaft 65 communicates its motion to the adjusting screw shaft 35 to adjust the friction wheel 26 toward the center of the disk 24. Thus if the machine is being driven forwardly and the clutch is closed the friction wheel is adjusted to decrease the speed of the driven parts until it reaches the center of the disk when the driven parts and the connections come to rest thus stopping the machine. On the other hand, if the machine be running in reverse direction, the closing of clutch 67, 68, effects a reverse adjustment of the friction wheel, this again bringing it to the center of the disk and stopping the machine. Consequently the effect is that when the clutch 67—68 is closed the driven member (whether we consider it as the shaft 27, axle 32 or shaft 65) effects a readjustment in the manner described of the variable speed transmitter to zero, thus bringing about its own stoppage. There is no unclutching nor disengagement during this operation, but only a readjustment of the transmitter, and the unclutching device 25 need not come into play, although, of course, the machine operator may independently employ that or suitable brakes at will. It will be seen that a progressively-variable-speed transmitter is preferred, that is to say, one which adjusts through all consecutive positions or speed ratios rather than step by step. Either a forward or reverse motion of the driven parts readjusts the transmitter to zero or stop position, whereas the previously described connections including clutch 59 might shift the friction wheel 26 beyond stop position thus actually reversing the direction of movement of the driven parts.

The described machine-stopping connections numbered 66 to 71, having the control levers therefor, afford a peculiarly advantageous and convenient combination. The reasons for this superiority include the following: The readjusting of the transmitter toward zero not merely reduces the driving action, but also effects a distinct retardation of the driven parts thus combining with its other functions that of a brake. Moreover, the momentum of the machine's driven parts is employed in effecting the adjustment of the transmitter toward zero and to that extent the momentum is reduced, thus assisting the stopping action. In fact, it will be seen that the momentum of the driven parts is thereby made use of to retard their own motion. It is believed that this is the first mechanism in which such use of variable speed transmitter has been made. It is found that the mode of slowing and stopping attained by this mechanism is radically different from that attained in any other manner: for example, by the previously described connections including clutch 59. By the connections 65 to 71 the machine quickly loses its high speed, rapidly slowing down at first but as the slowing progresses the rate of speed reduction decreases so that toward the end the retarding force is comparatively smaller and the machine finally is brought easily and gently to a stop. During the entire operation there has been no abrupt action but only a quick, efficient and easy change from running speed to zero speed or inaction. The operation will be substantially the same whether the machine has a regular and predetermined normal speed or whether its normal running is at different speeds as in the cases respectively of stationary or self-propelling machines. With the described stopping connections, it will be understood, is to be combined some appropriate starting connections, such as those already described, or a starting connection such as will be later described in reference to another embodiment of the invention.

If a diagram be constructed with time increments measured along the base line and the normal indicating speed, a curve of speed decrease may be theoretically constructed, it starting at the point of termination of the normal speed and convexing downwardly similarly to a curve of geometrical progression and extending tangentially to the base line at the end of the slowing operation. Moreover, the entire action is entirely automatic upon closing the clutch 67—68. The broad principle involved in this part of the present invention might in some cases be adapted for adjusting the variable speed transmitter from the zero adjustment to increase speed and in any case obviously the clutch might be thrown out at will to interrupt the automatic speed adjustment.

In the embodiment hereinafter to be described the special stop connections are illustrated in a particular combination with the driven shaft and certain mechanism comprising reciprocating parts performing functions in the turning out of manufactured articles, this mechanism having a cycle of operations definitely related to the driven shaft's rotation, and the combination being such that the mechanism comprising reciprocating parts may always be brought to rest with the reciprocating parts in some desirable predetermined position; but that special combination is only included herein as an illustration, it constituting a distinct and divisible subject with special functions and advantages of its own, not herein made the subject of claim.

All of the clutch shifting levers 49, 60, 72 and their control connections 50, 61, 73 may, for convenience, be operated by a single handle or control lever 76 through any convenient mechanism. Associated with the control lever is shown a notched plate 77 affording five lever positions. The indicated central position of the lever serves to adjust the stopping connections while the extreme positions of the lever correspond with the forward and reverse drive respectively. Between the central and extreme positions are indicated neutral notches to which the handle may be adjusted when it is not desired to change the state of motion of the driven parts. The lever 76 may be pivoted and provided with a recessed block or member 78 with which coöperate spring pressed members 79, 80 and 81 connected respectively by the links 50, 61 and 73 with the three clutch levers. In the extreme forward position of the lever 76 the member 79 will enter recess in 78 and in the rear extreme position the member 81 will enter recess. In the central position member 80 enters recess. The movement of either member entering recess serves to close the respective clutch, thus in the adjustment, as in Fig. 3, the lever 72 has been shifted to close the clutch 67, 68 to bring the machine to a stop. By this arrangement the operator may throw the control lever to one extreme position or the other according to whether he wishes the forward speed to increase or the reverse speed to decrease, or on the other hand the forward speed to decrease or the reverse speed to increase. Whenever the speed is satisfactory the lever will be left in one of the neutral notches whereupon the screw shaft 35 remains stationary and the variable-speed-transmitter is maintained in the desired adjustment. At any time that it is desired to bring the machine to a stop the lever is thrown to the central notch.

Reference will now be made to an illustration of the present improvement in connection with a stationary machine or one having a single normal running speed. For illustration there has been selected a machine which takes part in turning out the finished product of a factory; namely, a machine used in the manufacture of shoes on the McKay system for nailing the soles to the uppers (see Figs. 4 to 10). The nailing mechanisms operated by the main shaft of this machine need not be particularly described as they may be, generally speaking, similar to mechanisms illustrated in patents already issued or prior application now pending. As usual, the machine frame 18 may have its main shaft 94 in its head or upper part extending forwardly and rearwardly and near the forward end of the shaft are located the work support, presser foot, reciprocating awl and nail driver, picker and feeding means, and associated parts for holding, puncturing, and driving nails into the bottom $x$ of the shoe X.

The novel features of the present improvement may be conveniently applied to this class of machine in the following manner: The driver may consist of the pulley shaft 85 having the usual fast and loose pulleys. At the forward end of shaft 85 is the forwardly pressed friction disk 86 engaging the friction wheel 87 axially adjustable on shaft 88, having worm gear 89, 90 for communicating the motion to the upwardly extending rod 91 at the top of which is a worm gear 92, 93 whereby the rotation is communicated to the horizontal main shaft or driven member 94. Figs. 4 to 7 show the parts in driving adjustment. When desired the drive may be interrupted by the clutch device 97 between rod 91 and worm 92 and the clutch may be controlled by hand lever 98. For effecting the adjustment or shifting of the friction wheel 87, a lever 100 of the bell crank type may be employed, and connected with the lever is shown a rod 101 which is urged upwardly by a spring 102 thus tending to push the friction wheel toward full speed position. In combination with the stopping connections, to be described, this spring arrangement forms a very valuable starting expedient, it serving to move the wheel progressively across the disk from zero to full speed in a very satisfactory manner for certain purposes. The spring does not cause the wheel to jump across the disk and the wheel can only creep gradually across the disk as the rotation of the latter permits. This brings the machine to full speed without shock and without attention. As shown, the stopping of the nailing machine is automatically effected under proper control by connections from a driven member; namely, the shaft 94, which, when the connections are operative, serves to adjust the variable speed transmitter, in the advantageous manner already described, to zero position. The action is positive, efficient, and quick, yet easy and without noise or shock.

The connections from the driven member 94 to the transmitter 86, 87, comprise a member 105 in which are combined a gear 106 engaging gear 107 on shaft 94, and a cam or groove 108 adapted to engage a follower or a stud 109. The stud and cam are rendered relatively engageable and disengageable as a convenient means of connecting and disconnecting the connections between shaft 94 and the variable-speed-transmitter. The stud 109 is at the upper end of the rod 101 while the cam member 105 is loose on a short shaft 110. As seen in Figs. 4 and 6, the cam and stud are disengaged so that the member 105 rotates idly and the connections are inoperative. In order to render the connections operative at suitable times or at will, the following may be employed: The control lever 113 may be movable by the knee of the operator so as to swing about its pivot 114 and thereby through the link 115 to rock the arm 116 and the shaft 117. Thereby a yoked arm 118 at the upper end of the shaft 117 is swung and through its engagement with a grooved sleeve 119 carrying member 105 may shift the latter so that the cam 108 will engage or disengage the stud 109. The cam groove 108 at its first or inner end is concentric for a portion of a revolution to assist the stud 109, dropping thereinto and is thereafter eccentric with perhaps a concentric portion at the end for safety or other purposes. The operation is substantially that when the control lever 113 is thrown it presses the constantly rotating cam member 105 toward the stud 109 until the latter enters the cam groove whereupon the stud is thrown outwardly or downwardly by the cam thus forcing down the rod 101 and swinging the bell crank 100 to adjust the friction wheel 87 toward the center of the disk 86. The outer terminus of the cam groove corresponds with the zero position of the friction wheel. Consequently this is an example of a driven member causing a progressive adjustment of a variable speed transmitter to zero position to effect its own stoppage.

The modification in Figs. 8 to 10 is similar to the preceding excepting that both the starting and stopping are positively effected instead of employing a spring for starting as in the preceding. The grooved sleeve 119 is here omitted and instead a grooved collar 122 is pinned to the shaft 110 so that the knee lever causes the shaft to shift bodily endwise. The member 105 is loose between collars 123 fixed to the shaft. When the shaft shifts to the right (Fig. 8) the cam groove 108 engages the stud 109 to cause the stoppage of the machine as before described. When, however, the machine is to be started the following different mechanism comes into play: The spring 102 previously referred to is omitted. Fixed upon the shaft 110 is starting cam 130 having groove 131 which commences at the periphery with a concentric portion and terminates near the center with a continuous circular groove. On the same rod 101 that carries stud 109 is a second stud 132 located to coöperate with cam groove 131. It will be understood that the member 105 is loose on the shaft 110 and driven by the gear 107. The shaft 110 is independently continuously rotated by means of a pulley 133 splined to the shaft and connected by a belt 134 with a pulley 135 on the driver 85. The operation is merely that when shaft 110 is shifted to the left (Fig. 8) to disengage stud 109 from its cam the continuously rotated cam 130 is brought into engagement with its stud 132 so that the stud and the rod 101 are lifted from the zero position to the full speed position in which the parts are shown. Movement of the knee lever 113 disconnects the cam 130 and brings cam 108 into operation to stop the machine as before. Cam 130 is continuously rotating and effects the starting of the machine from the driver. Cam 108 is intermittently rotating and effects the stopping of the machine from the driven member.

While this application discloses several restarting devices acting after the stoppage of the machine for automatically readjusting the transmitter to put the machine in motion again, no claim is made specifically to the same herein, but the same is made the subject of applicant's co-pending application Serial No. 812,956 filed January 19, 1914. Also, while this application discloses the stoppage of a machine by adjustment of the variable speed transmitter to zero under the control of the driving shaft, that is not specifically claimed herein, but is made the subject of applicant's co-pending applications, Serial No. 822,330 filed March 9, 1914, and 836,593 filed May 6, 1914. Also, while this application discloses a certain control lever arrangement, for example, the novel arrangement of lever 113, and also a novel means for coupling or uncoupling the operating shaft, for example, the coupler 97, these features are not specifically claimed herein, but are illustrated and claimed in my aforesaid co-pending application, Serial No. 812,956.

It will thus be seen that there have been described various illustrations embodying the operation and principles of the present improvement and attaining the objects and conditions thereof, and other advantages will be apparent to those skilled in the art.

Since many matters of arrangement, detail, combination and other features may be indefinitely varied, it is not intended to limit the present invention to such features excepting so far as specified in the appended claims.

What is claimed is:

1. A machine speed changing mechanism including in combination, a driver, a driven member, a variable speed transmitter between said driver and driven member, and means whereby a running part of said mechanism may effect the adjustment of the transmitter to relatively increase the forward speed of the driven member.

2. A machine speed changing mechanism including in combination, a driver, a driven member, a variable speed transmitter between said driver and driven member, and means whereby said driver may effect the adjustment of the transmitter to relatively increase the forward speed of the driven member.

3. A machine speed changing mechanism including in combination, a driver, a driven member, a variable speed transmitter between said driver and driven member, connections including a cam and follower between a running part of said mechanism and said transmitter whereby adjustment of the transmitter may be automatically effected, said connections being normally inoperative during the running of the machine, and a controller for rendering said connections operative at suitable times to change the relative speed of the driven member.

4. A machine speed changing mechanism including in combination, a driver, a driven member, a variable speed transmitter between said driver and driven member, connections including a clutch between a running part of said mechanism and said transmitter whereby adjustment of the transmitter may be automatically effected, said connections being normally inoperative during the running of the machine, and a controller for rendering said connections operative by closing said clutch at suitable times to change the relative speed of the driven member.

5. A machine speed changing mechanism including in combination, a driver, a driven member, a variable speed transmitter between said driver and driven member and means whereby said driven member may effect the adjustment of the transmitter to change the speed ratio.

6. A machine speed changing mechanism including in combination, a driver, a driven member, a variable speed transmitter between said driver and driven member, connections between said driven member and said transmitter whereby adjustment of the transmitter may be automatically effected, said connections being normally inoperative during the running of the machine, and a controller for rendering said connections operative at suitable times to change the relative speed of the driven member.

7. A machine speed changing mechanism including in combination, a driver, a driven member, a variable speed transmitter between said driver and driven member and means whereby said driven member may effect the adjustment of the transmitter toward or to zero position, and means for adjusting the transmitter toward driving position.

8. A machine speed changing mechanism including in combination, a driver, a driven member, a variable speed transmitter between said driver and driven member, connections between said driven member and said transmitter whereby adjustment of the transmitter toward zero position may be automatically effected, said connections being normally inoperative during the running of the machine, and a controller for rendering said connections operative at suitable times to change the relative speed of the driven member, and means for adjusting the transmitter toward driving position.

9. A machine speed changing mechanism including in combination, a driver, a driven member, a variable speed transmitter between said driver and driven member, connections between said driven member and said transmitter whereby adjustment of the transmitter to zero position may be automatically effected, said connections being normally inoperative during the running of the machine, and a controller for rendering said connections operative at suitable times whereby the driven member is caused to bring about its own stoppage.

10. A machine speed changing mechanism including in combination, a driver, a driven member, a variable speed transmitter between said driver and driven member, connections between said driven member and said transmitter whereby adjustment of the transmitter to zero position may be automatically effected, said connections being normally inoperative during the running of the machine, and a controller for rendering said connections operative whereby at suitable times the driving action is decreased and the driven member is simultaneously retarded to bring about its own stoppage substantially in the manner specified.

11. A machine speed changing mechanism including in combination, a driver, a driven member, a variable speed transmitter between said driver and driven member, connections, including a cam having a uniform throw, between said driven member and said transmitter whereby adjustment of the transmitter to zero position may be automatically effected with a decreasing rate of speed decrease, said connections being normally inoperative during the running of the machine, and a controller for rendering said connections operative at suitable times whereby the driven member is caused to bring about its own stoppage.

12. A machine speed changing mechanism including in combination, a driver, a driven member, a variable speed transmitter between said driver and driven member, connections between said driven member and said transmitter whereby adjustment of the transmitter to zero position may be automatically effected, said connections being normally inoperative during the running of the machine, a controller for rendering said connections operative at suitable times whereby the driven member is caused to bring about its own stoppage, and means for adjusting said transmitter from zero to restart the driven member.

13. A machine speed changing mechanism including in combination, a driver, a driven member, a variable speed transmitter between said driver and driven member, connections between said driven member and said transmitter whereby adjustment of the transmitter to zero position may be automatically effected, said connections being normally inoperative during the running of the machine, and a controller for rendering said connections operative at suitable times whereby the driven member may be caused to bring about its own stoppage, said controller adapted to be thrown out to interrupt the adjustment and thereby permit driving at reduced speed.

In testimony whereof I affix my signature in presence of two witnesses.

AUGUST R. SCHOENKY.

Witnesses:
Thomas J. Carty,
Wm. C. Boisvert.